United States Patent
Liu et al.

(10) Patent No.: US 11,218,202 B2
(45) Date of Patent: Jan. 4, 2022

(54) BEAM CONFIGURATION METHOD, A MOBILE STATION AND A BASE STATION

(71) Applicant: NTT DOCOMO, INC., Tokyo (JP)

(72) Inventors: Min Liu, Beijing (CN); Liu Liu, Beijing (CN); Huiling Jiang, Beijing (CN); Xin Wang, Beijing (CN); Qin Mu, Beijing (CN); Chongning Na, Beijing (CN); Jing Wang, Beijing (CN); Yuichi Kakishima, Tokyo (JP); Kazuaki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/496,295

(22) PCT Filed: Mar. 7, 2018

(86) PCT No.: PCT/CN2018/078264
§ 371 (c)(1),
(2) Date: Sep. 20, 2019

(87) PCT Pub. No.: WO2018/171426
PCT Pub. Date: Sep. 27, 2018

(65) Prior Publication Data
US 2020/0076487 A1 Mar. 5, 2020

(30) Foreign Application Priority Data
Mar. 23, 2017 (CN) .................. 201710179483.X

(51) Int. Cl.
*H04B 7/06* (2006.01)
*H04B 7/0408* (2017.01)
*H04W 16/28* (2009.01)

(52) U.S. Cl.
CPC ......... *H04B 7/0617* (2013.01); *H04B 7/0408* (2013.01); *H04B 7/0695* (2013.01); *H04W 16/28* (2013.01)

(58) Field of Classification Search
CPC .. H04B 7/0617; H04B 7/0408; H04B 7/0695; H04W 16/28
See application file for complete search history.

(56) References Cited

U.S. PATENT DOCUMENTS

2017/0006593 A1* 1/2017 Liu ...................... H04W 16/32
2017/0054534 A1* 2/2017 Sang ................... H04W 72/046
(Continued)

FOREIGN PATENT DOCUMENTS

CN 102045097 A 5/2011
WO WO-2016011199 A1 1/2016
(Continued)

OTHER PUBLICATIONS

International Search Report from counterpart PCT/CN2018/078264, dated May 18, 2018.
(Continued)

*Primary Examiner* — Ajay Cattungal
(74) *Attorney, Agent, or Firm* — Osha Bergman Watanabe & Burton LLP

(57) ABSTRACT

Provided are a beam configuration method, a mobile station and a base station. The beam configuration method performed by a base station according to embodiments of the present invention includes: determining a beam transmission scheme for a mobile station according to performance of the mobile station; and transmitting information to the mobile station according to the beam transmission scheme.

20 Claims, 5 Drawing Sheets

(56) References Cited

U.S. PATENT DOCUMENTS

| | | | | |
|---|---|---|---|---|
| 2017/0141894 A1* | 5/2017 | Wei | ........................ | H04L 5/0048 |
| 2017/0195998 A1* | 7/2017 | Zhang | .................... | H04L 5/0057 |
| 2017/0214444 A1* | 7/2017 | Nigam | .................... | H04B 7/063 |
| 2017/0273058 A1* | 9/2017 | Agiwal | ................ | H04B 7/0617 |
| 2018/0227887 A1* | 8/2018 | Hakola | .................. | H04B 7/022 |
| 2020/0008216 A1* | 1/2020 | Iyer | ........................ | H04W 72/04 |
| 2020/0036430 A1* | 1/2020 | Kim | ........................ | H04B 7/088 |
| 2020/0221427 A1* | 7/2020 | Nilsson | .................. | H04B 7/024 |
| 2020/0389220 A1* | 12/2020 | Kang | ................ | H04W 74/0833 |

FOREIGN PATENT DOCUMENTS

| | | |
|---|---|---|
| WO | WO-2016044994 A1 | 3/2016 |
| WO | WO-2016086144 A1 | 6/2016 |
| WO | WO-2016172840 A1 | 11/2016 |

OTHER PUBLICATIONS

International Preliminary Report on Patentability from counterpart PCT/CN2018/078264, including an English translation of the Written Opinion, dated Sep. 24, 2019.

* cited by examiner ately apparent by a more detailed description of the embodiments of the

BEAM CONFIGURATION METHOD, A MOBILE STATION AND A BASE STATION

CROSS-REFERENCE TO RELATED APPLICATIONS

This patent application is a 371 U.S. National Phase of International Application No. PCT/CN2018/078264, filed on Mar. 7, 2018, which claims priority to Chinese Patent Application No. 201710179483X, filed on Mar. 23, 2017. The entire disclosures of the above applications are incorporated herein by reference.

TECHNICAL FIELD

The present invention relates to a field of communication, and in particular to a beam configuration method performed in a communication system and to a corresponding mobile station and base station.

BACKGROUND

In a high frequency scenario of 5G, or in a scenario where a user equipment (UE) is connected to a 5G transmit/receive point (base station) or a long term evolution (LTE) base station through dual connectivity, using beamforming techniques in the UE and the base station is proposed, that is, both the base station and the UE can use multiple beams for signal transmission and reception. Each transmission beam of the base station and each reception beam of the UE may form one downlink beam pair, and each reception beam of the base station and each transmission beam of the UE may form one uplink beam pair.

Due to high penetration loss and diffraction at high frequencies, the link beam pairs between the base station and the UE is blocked easily, and the stability and transmission quality of the information transmission in the NR Physical Downlink Control Channel (PDCCH) will be difficult to be guaranteed.

SUMMARY OF THE INVENTION

According to one embodiment of the present invention, a beam configuration method performed by a base station is provided, comprising: determining a beam transmission scheme for a mobile station according to performance of the mobile station; transmitting information to the mobile station according to the beam transmission scheme.

According to another embodiment of the present invention, a beam configuration method performed by a mobile station is provided, comprising: transmitting performance of the mobile station; monitoring information transmitted by a base station according to a beam transmission scheme for the mobile station, the beam transmission scheme being determined by the base station according to the performance of the mobile station.

According to another embodiment of the present invention, a base station is provided, comprising: a processing unit configured to determine a beam transmission scheme for a mobile station according to performance of the mobile station; a transmitting unit configured to transmit information to the mobile station according to the beam transmission scheme.

According to another embodiment of the present invention, a mobile station is provided, comprising: a transmitting unit configured to transmit performance of the mobile station; a processing unit configured to monitor information transmitted by the base station according to a beam transmission scheme for the mobile station, the beam transmission scheme being determined by the base station according to the performance of the mobile station.

The beam configuration method and the corresponding base station and mobile station provided according to the embodiments of the present invention enable the base station to determine a beam transmission scheme for the mobile station according to performance of the mobile station, and to transmit information with the beam transmission scheme. Accordingly, the mobile station receives and decodes the information transmitted by the base station by monitoring the corresponding beams, thereby improving the stability and transmission quality of information transmission in a communication network.

BRIEF DESCRIPTION OF THE DRAWINGS

The above as well as other objects, features and advantages of the present invention will become more apparent by a more detailed description of the embodiments of the present invention in conjunction with the accompanying drawings. The accompanying drawings are intended to provide a further understanding of the embodiments of the present invention. In the accompanying drawings, the same reference numerals generally refer to the same components or steps.

DESCRIPTION OF THE EMBODIMENTS

In order to make the objects, the technical solutions and the advantages of the present invention more apparent, exemplary embodiments according to the present invention will be described in detail below with reference to the accompanying drawings. It is apparent that the described embodiments are only a part of the embodiments of the present invention and not all of the embodiments of the present invention. It should be understood that the present invention is not limited by the exemplary embodiments described here. All other embodiments obtained by those skilled in the art based on the embodiments of the present invention described in the present invention without creative labor shall fall within the protection scope of the present invention.

Figure 1:
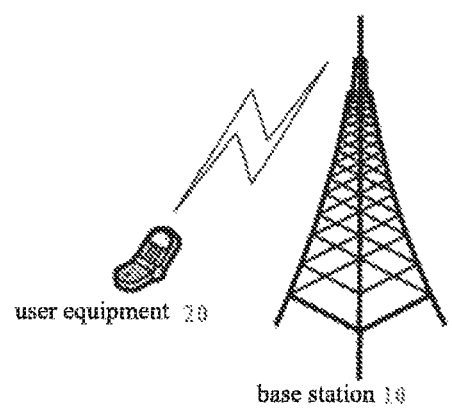
FIG. 1 shows a wireless communication system according to embodiments of the present invention.

First, a wireless communication system according to embodiments of the present invention is described with reference to FIG. 1. As shown in FIG. 1, the wireless communication system may include a base station 10 and a user equipment (UE) 20. The UE 20 may receive downlink PDCCHs and PDSCHs transmitted by the base station 10. It needs to be noted that although one base station and one UE are shown in FIG. 1, this is merely illustrative and the wireless communication system may include one or more base stations and one or more UEs. Furthermore, the base station 10 may be a transmit and receive point (TRP), or may schedule and manage multiple TRPs with a same central processor. The terms "base station" and "TRP" may be used interchangeably, hereinafter.

In the above process, the base station 10 may have multiple directional antennas, that is, multiple transmission beams, so that signals may be transmitted to the UE with multiple transmission beams. Furthermore, in some scenarios, the UE 20 may have multiple directional antennas, that is, multiple reception beams, so that the signals transmitted by the base station may be received with multiple reception beams. The UE 20 may receive information transmitted by the base station with all the reception beams simultaneously, or may select a certain number of reception beams among all the reception beams to receive the information, and may also receive the information with the multiple reception beams as a quasi-omnidirectional antenna.

Figure 2:
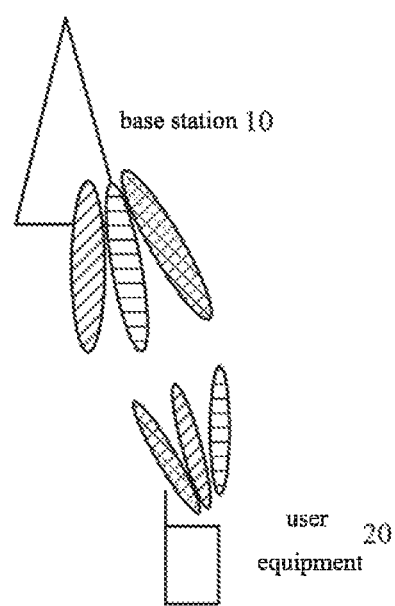
FIG. 2 shows an exemplary diagram of information transmission according to embodiments of the present invention.

FIG. 2 shows an exemplary diagram of information transmission according to embodiments of the present invention. As shown in FIG. 2, when the base station 10 is capable of forming multiple transmission beams and the UE 20 is capable of forming multiple reception beams, when the base station 10 transmits the downlink control information (PDCCH) and/or the downlink data information (PDSCH) to the UE 20, the UE 20 will receive the information with one or more of its multiple reception beams.

Figure 3:
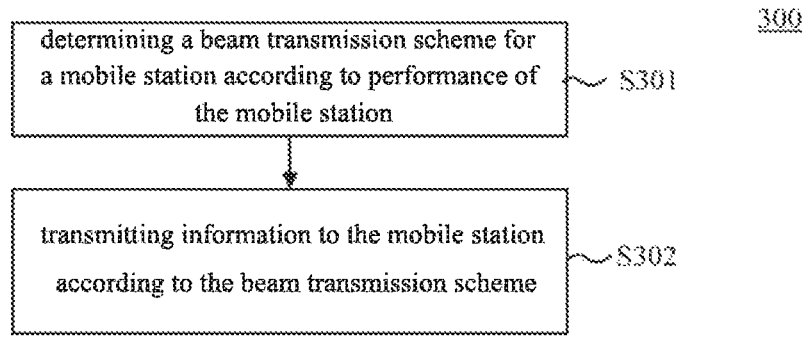
FIG. 3 shows a flowchart of a beam configuration method according to embodiments of the present invention.

FIG. 3 shows a flow diagram of a beam configuration method 300 which may be performed by the base station according to embodiments of the present invention.

As shown in FIG. 3, in step S301, a beam transmission scheme for the mobile station is determined according to performance of the mobile station. In this step, the performance of the mobile station may be determined by the number of beams that the mobile station is capable of simultaneously monitoring in one time slot. Of course, the representation manner of the performance of the mobile station is only an example. In the embodiments of the present invention, other manners of determining the performance of the mobile station may also be utilized, and no limitation is imposed herein. The performance of the mobile station may be made known to the base station by means of the mobile station reporting to the base station. For example, the base station may transmit reference signals (RSs) for beam selection or the like to the mobile station. The mobile station carries out measurement after receiving the RSs transmitted by the base station, and reports to the base station the number of beams that the mobile station is capable of monitoring simultaneously in one time slot and indication information for each selected beam, such as beam-index or the like. Of course, the above manner of determining the performance of the mobile station is only an example. In practical applications, any other manner of determining the performance of the mobile station may be adopted, and no limitation is imposed herein.

In another embodiment of the present invention, the base station may not only determine the beam transmission scheme according to the performance of the mobile station, but also jointly determine an appropriate beam transmission scheme and transmit the information by further combining a requirement of the mobile station for the PDCCH channel robustness. For example, when the speed of the UE is high, in a scenario requiring high robustness and low latency, for example a URLLC scenario, the base station may repeatedly transmit the same PDCCH on multiple beams. When the speed of the UE is low and the requirement for channel robustness is not high, the base station may choose to transmit the PDCCH on a single beam, and the PDCCHs transmitted on different beams are different.

In step S302, information is transmitted to the mobile station according to the beam transmission scheme.

Figure 4:
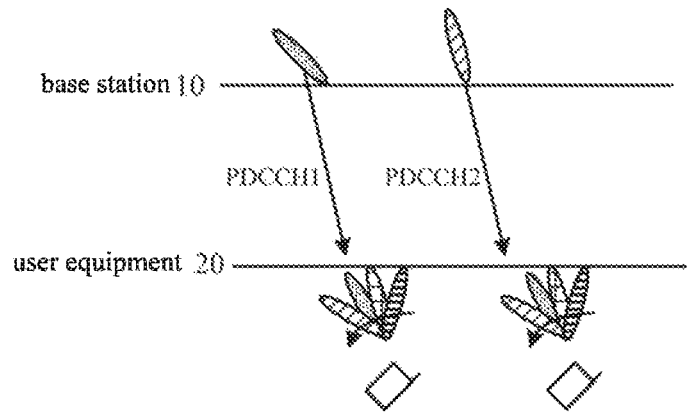
FIG. 4 shows a schematic diagram of a beam transmission scheme between a base station and a UE in one embodiment of the present invention.

Different beam transmission schemes as well as manners in which the base station transmits the information to the mobile station determined according to different UE performance and/or the requirement of the mobile station for the channel robustness will be described in detail below with reference to FIG. 4-FIG. 9. In one embodiment of the present invention, when the UE is capable of monitoring multiple beams simultaneously in one time slot, the base station may transmit the information to the mobile station by using one or more of the multiple beams that the mobile station is capable of monitoring. FIG. 4 shows a schematic diagram of the beam transmission scheme between the base station and the UE in one embodiment of the present invention. As shown in FIG. 4, in one time slot, the mobile station is capable of monitoring simultaneously, for example, 4 beams. In this case, when the requirement of the UE for channel robustness is not high, the base station may select one of the multiple beams that the mobile station is capable of monitoring to transmit the information to the UE. Alternatively, as shown in FIG. 4, in each time slot, the base station may respectively transmit different information, such as PDCCH1 and PDCCH2, on different beams. Of course, the base station may also choose to transmit the same information with the same or different beams in different time slots, for example, transmitting PDCCH1 in multiple time slots to further improve the robustness of the PDCCH. Accordingly, in the embodiment shown in FIG. 4, the UE will respectively monitor the information transmitted by the base station by using the multiple beams that it is capable of monitoring in each time slot, to ensure that the information transmitted by the base station can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

Figure 5:
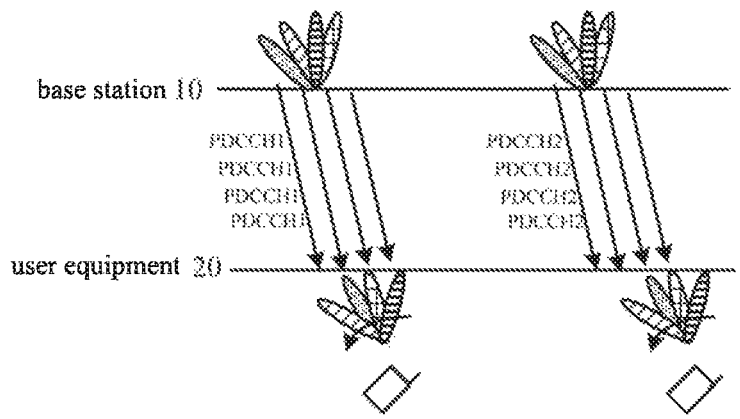
FIG. 5 shows a schematic diagram of a beam transmission scheme between a base station and a UE in another embodiment of the present invention.

FIG. 5 shows a schematic diagram of the beam transmission scheme between the base station and the UE in another embodiment of the present invention. As shown in FIG. 5, in one time slot, the mobile station is also capable of monitoring 4 beams simultaneously, and in the case that the requirement of the UE for channel robustness is high, the base station may select at least two beams from the multiple beams that the mobile station is capable of monitoring to transmit the information to the UE. In the example shown in FIG. 5, in one time slot, the base station selects each of the 4 beams that the mobile station is capable of monitoring to transmit the information to the mobile station. Alternatively, for the requirement for the PDCCH robustness, as shown in FIG. 5, in each time slot, the base station may respectively transmit the same information on different beams. For example, in one time slot, the information transmitted by the base station through all the beams is PDCCH1, and in a next time slot, the information transmitted by the base station through all beams is PDCCH2. Of course, if the requirement of the UE for channel robustness is not that high, the base station may also adopt a manner of beam division multiplexing (BDM) to transmit different information on different beams in one time slot. For example, in one same time slot, the base station may transmit PDCCH1 on any three beams of the whole four beams and transmit PDCCH2 on the other one of the whole four beams. The description of the number of beams used by the base station and transmitting information is only an example, and in practical applications, no limitation is imposed on this. Accordingly, in the embodiment shown in FIG. 5, the UE will respectively monitor the information transmitted by the base station by using multiple beams that it is capable of monitoring in each time slot, to ensure that the information transmitted by the base station on all beams can be received and decoded. In the embodiments of the present invention, the performance of the UE, that is, being capable of monitoring 4 beams simultaneously, is only an example. In practical applications, the number of beams that the UE is capable of monitoring simultaneously in one time slot is not limited.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

Figure 6:
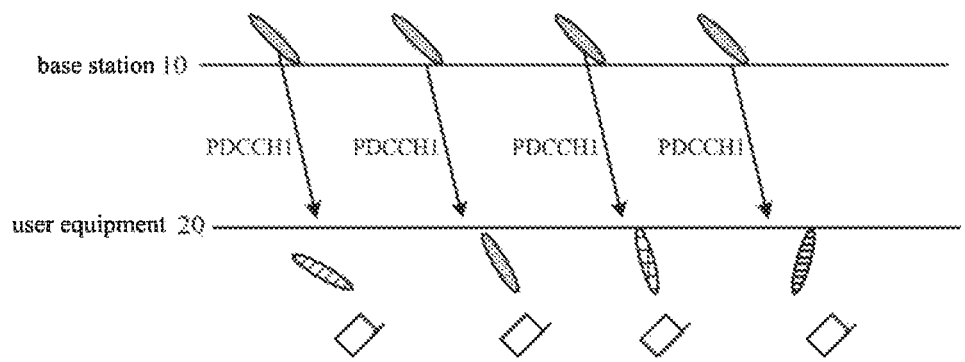
FIG. 6 shows a schematic diagram of a beam transmission scheme between a base station and a UE in one embodiment of the present invention.

In another embodiment of the present invention, when the mobile station is capable of monitoring multiple beams, but in one time slot the UE is capable of monitoring only one beam, the base station may transmits the information to the mobile station in one time slot by using one of the multiple beams that the mobile station is capable of monitoring. FIG. 6 shows a schematic diagram of a beam transmission scheme between the base station and the UE in one embodiment of the present invention. As shown in FIG. 6, the mobile station is capable of simultaneously monitoring, for example, 4 beams, but in one time slot, the mobile station is capable of monitoring only one beam of the 4 beams. In this case, when the requirement of the UE for channel robustness is not high, the base station may select any one of the multiple beams that the mobile station is capable of monitoring to transmit the information to the UE. Alternatively, as shown in FIG. 6, in multiple consecutive time slots, the base station may transmit the same information to the mobile station with one same beam of the beams that the mobile station is capable of monitoring. For example, considering that the UE is capable of monitoring 4 beams in total, therefore, the base station may transmit a same PDCCH1 to the UE by using a same beam in 4 consecutive time slots. Accordingly, in the embodiment shown in FIG. 6, the UE will sequentially monitor the information transmitted by the base station in each time slot of these 4 consecutive slots by respectively using each of the four beams that it is capable of monitoring, to ensure that the UE is certainly capable of receiving and decoding the information transmitted by the base station after at least 4 time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH2 by using a same beam in 6 consecutive time slots, so that the UE is capable of acquiring the information transmitted by the base station through a sequential monitoring of each beam in the 6 consecutive time slots.

Figure 7:
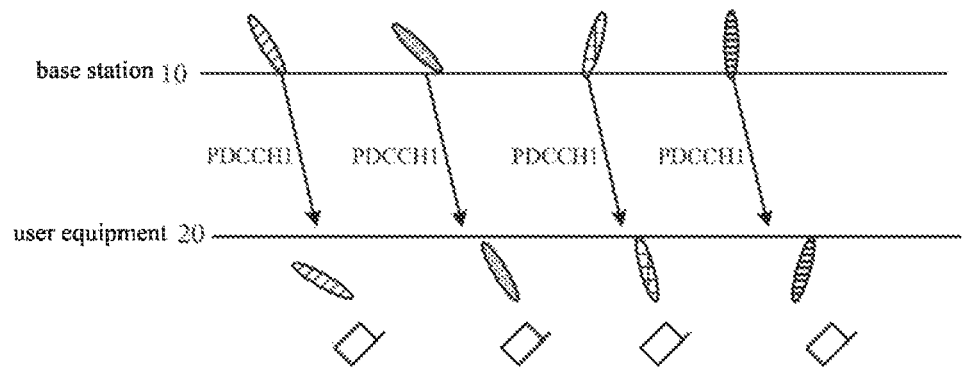
FIG. 7 shows a schematic diagram of a beam transmission scheme between a base station and a UE in one embodiment of the present invention.

FIG. 7 shows a schematic diagram of a beam transmission scheme between the base station and the UE in one embodiment of the present invention. As shown in FIG. 7, the mobile station may also simultaneously monitor, for example, 4 beams, but is capable of monitoring only one beam in one time slot. When the requirement of the UE for channel robustness is high, the base station may transmit the information to the mobile station respectively with different beams in the beams that the mobile station is capable of monitoring in multiple consecutive time slots. Alternatively, as shown in FIG. 7, in multiple consecutive time slots, the base station may sequentially transmit the same information to the mobile station with one beam of the beams that the mobile station is capable of monitoring. For example, considering that the UE is capable of monitoring 4 beams in total, therefore, the base station may transmit the same PDCCH1 to the UE in 4 consecutive time slots by sequentially adopting the 4 beams that the UE is capable of monitoring. Accordingly, in the embodiment shown in FIG. 7, the UE will monitor the information transmitted by the base station in each time slot of the 4 consecutive time slots by respectively using the beam used by the base station to transmit the information in the current time slot, to ensure that the UE may receive and decode the information transmitted by the base station with the beam used by the base station to transmit the information each time in these 4 time slots. Of course, in this embodiment, if the requirement of the UE for channel robustness is not very high, the base station may further transmit different information to the UE in different time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH1 with different beams in 6 consecutive time slots; or may transmit the PDCCH1 in the first 3 time slots and the PDCCH2 in the last 3 time slots. The UE will respectively receive the information transmitted by the base station in these 6 consecutive time slots through a corresponding beam.

In the embodiments of the present invention, since the UE needs to use the beam currently used by the base station for transmitting the information to monitor the information transmitted by the base station in each time slot, the UE and the base station need to coordinate in, for example, beam information that the base station will use to transmit the information in the next time slot. Alternatively, when the base station transmits the reference signals (RSs) for beam selection to the mobile station, the number of beams that need to be selected and reported, such as 3 beams, may be notified to the UE at the same time. After receiving the RSs, the UE will carry out measurement and report information of the selected 3 beams to the base station according to an indication of the base station. Accordingly, after receiving the 3 beams reported by the UE, the base station will sequentially transmit the PDCCH according to an order of the beams reported by the UE, so that the UE is capable of correctly selecting corresponding beams to monitor the information transmitted by the base station. Furthermore, in another embodiment of the present invention, the base station may not need to inform the UE of the number of beams to be reported when transmitting the RSs. In this case, the UE will report all the beam information that it is capable of monitoring to the base station, and when determining to use, for example, the beam transmission scheme shown in FIG. 7 to transmit the information, the base station will inform the UE of the number of beams that it chooses to use, and sequentially transmit the information according to the order reported by the UE. For example, the base station will inform the UE that it will use 3 beams of 5 beams reported by the UE to transmit the PDCCH, and the UE will monitor according to the order correspondence of the beams reported by itself in 3 consecutive time slots. Preferably, the UE may further repeat this monitoring order in the next three time slots, instead of using the other two beams of the 5 beams that it reports, to monitor information. In another embodiment of the present invention, the base station may further select any beam to transmit according to information of the beam selection reported by the UE, and directly inform the UE of the indication information of the beam that it will use to transmit the information, so that the UE selects the corresponding beam to monitor in time. The above coordination scheme for the beam information between the base station and the UE is only an example, and the implementation in the embodiments of the present invention is not limited thereto.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions, to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

Figure 8:
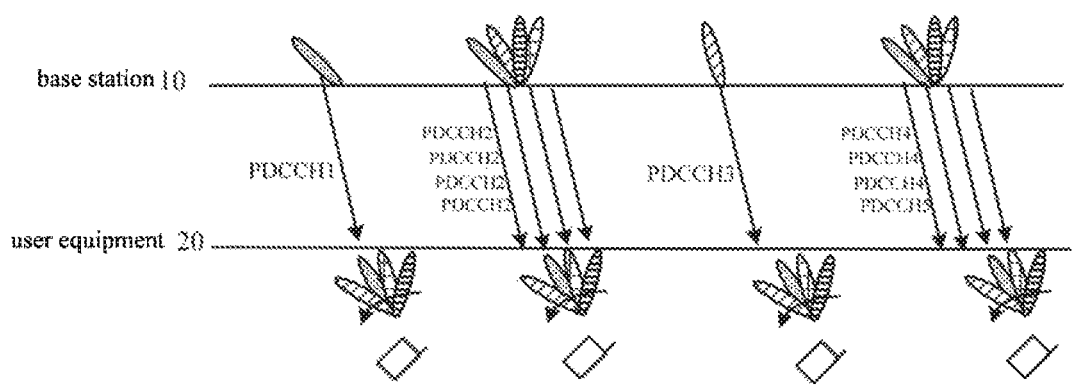
FIG. 8 shows a schematic diagram of a beam transmission scheme between a base station and a UE in one embodiment of the present invention.

A beam configuration method in the embodiments of the present invention, which respectively consider different performance of the UE and requirements for channel robustness, has been described with the above various embodiments in FIG. 4-FIG. 7. In practical application scenarios, the requirement of the UE for channel robustness may not be constant under different performance of the UE. Therefore, it may also be considered to propose more beam transmission schemes in combination with the respective exemplary embodiments in FIG. 4-FIG. 7. FIG. 8 shows a schematic diagram of a beam transmission scheme between the base station and the UE in one embodiment of the present invention. According to that shown in FIG. 8, in one time slot, the UE is capable of simultaneously monitoring multiple beams and will perform blind detection for all beams that it is capable of monitoring in each time slot. The numbers of beams that the base station may use to transmit the information in different time slots in FIG. 8 are not the same. For example, in one time slot, the base station transmits the information with one of the multiple beams that the UE is capable of monitoring, while in another time slot, the base station will transmit the information with multiple beams. The information transmitted by the base station in different time slots or on different beams may also be the same or different. In short, the embodiment in FIG. 8 may be equivalent to a variant of the beam transmission scheme in which the embodiments shown in FIG. 4 and FIG. 5 are combined respectively. It should be noted that the combined beam transmission scheme in FIG. 8 is only an example, and the number of time slots for the case where the base station transmits with one beam, the number of time slots for the case where the base station transmits with multiple beams and the transmitted information may all be flexibly adjusted according to practical application scenarios, and are not limited herein.

Figure 9:
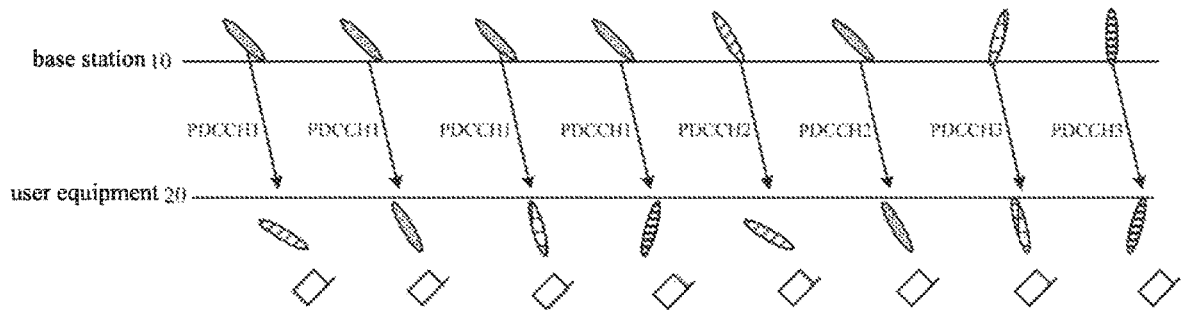
FIG. 9 shows a schematic diagram of a beam transmission scheme between a base station and a UE in one embodiment of the present invention.

FIG. 9 shows a schematic diagram of the beam transmission scheme between the base station and the UE in one embodiment of the present invention. According to that shown in FIG. 9, the UE is capable of simultaneously monitoring multiple beams, but in one time slot, the UE is capable of monitoring only one beam. The base station in FIG. 9 may choose to transmit the same information through the same beam in multiple consecutive time slots, so that the UE carries out blind detection, reception and decoding, or may also transmit the same or different information in different time slots with different beams, so that the UE respectively monitors the information transmitted by the base station by using the beam used by the base station to transmit the information in the current time slot. In short, the embodiment in FIG. 9 may be equivalent to a variant of the beam transmission scheme in which the embodiments shown in FIG. 6 and FIG. 7 are combined respectively. It should be noted that the combined beam transmission scheme in FIG. 9 is only an example, and a switching period between different beam transmission schemes and a content of the information transmitted may be flexibly adjusted according to practical application scenarios, and are not limited herein.

In the above embodiments of the present invention, predefined signaling may be adopted to indicate the respective behaviors of the base station and the UE in the beam transmission scheme. The signaling may be indicated in some special fields in physical broadcast channel (PBCH), DCI in CSS, MAC layer signaling, or physical downlink shared channel (PDSCH). For example, different beam transmission schemes may be indicated with a preset number of bits, such as indicated with 3 bits, where 000 indicates the beam transmission scheme in the example in FIG. 4, and 001 indicates the beam transmission scheme in the example in FIG. 5, and so on. In addition, a combination of different beam transmission schemes may be indicated by some preset fields, and the switching period between schemes or the like may be further illustrated.

When the UE monitors information on multiple beams, the base station may inform a manner of monitoring of the UE with signaling. For example, bit 1 may be used to indicate independent decoding for different monitored information, while bit 0 may be used to indicate to jointly decode multiple monitored information. Further, the base station may also indicate the spacing relationship on the time-frequency resources between the respective PDCCHs in the case of joint decoding with signaling.

In the embodiment as shown, for example, in FIG. 7, alternatively, the base station may indicate the number of beams that the UE needs to select and report with indication information in some special fields in the physical broadcast channel (PBCH), the DCI in CSS, the MAC layer signaling, or the physical downlink shared channel (PDSCH), and specific information of the beam used in a certain time slot, such as beam ID, CRI feedback, or the like, may be exchanged between the base station and the UE.

The beam configuration method according to the embodiments of the present invention may enable the base station to determine the beam transmission scheme for the mobile station according to the performance of the mobile station, and to transmit the information with the beam transmission scheme. Accordingly, the mobile station receives and decodes the information transmitted by the base station by monitoring the corresponding beams, thereby improving stability and transmission quality of information transmission in a communication network.

Figure 10:
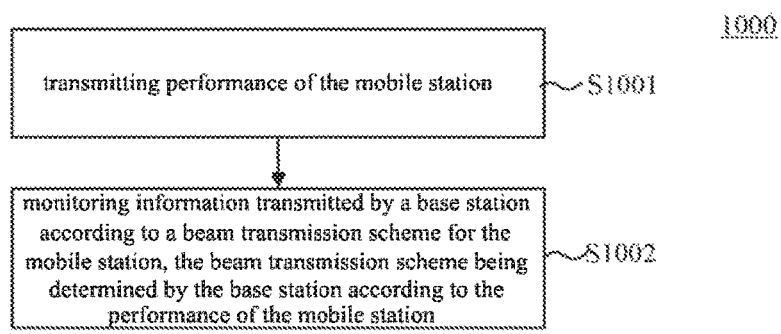
FIG. 10 shows a flowchart of a beam configuration method according to embodiments of the present invention.

FIG. 10 shows a flow diagram of a beam configuration method 1000 which may be performed by a mobile station according to embodiments of the present invention.

As shown in FIG. 10, in step S1001, performance of the mobile station is transmitted. In this step, the performance of the mobile station may be determined by the number of beams that the mobile station is capable of simultaneously monitoring in one time slot. Of course, the representation manner of the performance of the mobile station is only an example. In the embodiments of the present invention, other manners of determining the performance of the mobile station may also be utilized, and no limitation is imposed herein. The performance of the mobile station may be made known to a base station by means of the mobile station reporting to the base station. For example, the mobile station may receive reference signals (RSs) for beam selection or the like transmitted by the base station and carry out measurement, and then report to the base station the number of beams that it is capable of simultaneously monitoring in one time slot and indication information of each selected beam, such as beam-index or the like. Of course, the above manner of determining the performance of the mobile station is only an example. In practical applications, any other manner of determining the performance of the mobile station may be adopted, and no limitation is imposed herein.

In step S1002, the mobile station monitors information transmitted by the base station according to a beam transmission scheme for the mobile station, the beam transmission scheme being determined by the base station according to the performance of the mobile station.

In one embodiment of the present invention, the base station determines the beam transmission scheme according to the performance of the mobile station, and carries out transmission, so that the mobile station monitors the information transmitted by the base station. In another embodiment of the present invention, the base station may not only determine the beam transmission scheme according to the performance of the mobile station, but also jointly determine an appropriate beam transmission scheme and transmit the information by further combining a requirement of the mobile station for the PDCCH channel robustness. For example, when the speed of the UE is high, in a scenario requiring high robustness and low latency, for example a URLLC scenario, the base station may repeatedly transmit the same PDCCH on multiple beams. When the speed of the UE is low and the requirement for channel robustness is not high, the base station may choose to transmit the PDCCH on a single beam, and the PDCCHs transmitted on different beams are different.

Different beam transmission schemes will be described in detail below according to different UE performance and the requirement of the UE for channel robustness. In one embodiment of the present invention, when the UE is capable of monitoring multiple beams simultaneously in one time slot, the base station may transmit the information to the mobile station by using one or more of the multiple beams that the mobile station is capable of monitoring. FIG. 4 shows a schematic diagram of the beam transmission scheme between the base station and the UE in one embodiment of the present invention. As shown in FIG. 4, in one time slot, the mobile station is capable of monitoring simultaneously, for example, 4 beams. In this case, when the requirement of the UE for channel robustness is not high, the base station may select one of the multiple beams that the mobile station is capable of monitoring to transmit the information to the UE. Alternatively, as shown in FIG. 4, in each time slot, the base station may respectively transmit different information, such as PDCCH1 and PDCCH2, on different beams. Of course, the base station may also choose to transmit the same information with the same or different beams in different time slots, for example, transmitting PDCCH1 in multiple time slots to further improve the robustness of the PDCCH. Accordingly, in the embodiment shown in FIG. 4, the UE will respectively monitor the information transmitted by the base station by using the multiple beams that it is capable of monitoring in each time slot to ensure that the information transmitted by the base station can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

FIG. 5 shows a schematic diagram of the beam transmission scheme between the base station and the UE in another embodiment of the present invention. As shown in FIG. 5, in one time slot, the mobile station is also capable of monitoring 4 beams simultaneously, and in the case that the requirement of the UE for channel robustness is high, the base station may select at least two beams from the multiple beams that the mobile station is capable of monitoring to transmit the information to the UE. In the example shown in FIG. 5, in one time slot, the base station selects each of the 4 beams that the mobile station is capable of monitoring to transmit the information to the mobile station. Alternatively, for the requirement for the PDCCH robustness, as shown in FIG. 5, in each time slot, the base station may respectively transmit the same information on different beams. For example, in one time slot, the information transmitted by the base station through all the beams is PDCCH1, and in a next time slot, the information transmitted by the base station through all beams is PDCCH2. Of course, if the requirement of the UE for channel robustness is not that high, the base station may also adopt a manner of beam division multiplexing (BDM) to transmit different information on different beams in one time slot. For example, in one same time slot, the base station may transmit PDCCH1 on any three beams of the whole four beams and transmit PDCCH2 on the other one of the whole four beams. The description of the number of beams used by the base station and transmitting information is only an example, and in practical applications, no limitation is imposed on this. Accordingly, in the embodiment shown in FIG. 5, the UE will respectively monitor the information transmitted by the base station by using multiple beams that it is capable of monitoring in each time slot to ensure that the information transmitted by the base station on all beams can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

In another embodiment of the present invention, when the mobile station is capable of monitoring multiple beams, but in one time slot the UE is capable of monitoring only one beam, the base station may transmits the information to the mobile station in one time slot by using one of the multiple beams that the mobile station is capable of monitoring. FIG. 6 shows a schematic diagram of a beam transmission scheme between the base station and the UE in one embodiment of the present invention. As shown in FIG. 6, the mobile station is capable of simultaneously monitoring, for example, 4 beams, but in one time slot, the mobile station is capable of monitoring only one beam of the 4 beams. In this case, when the requirement of the UE for channel robustness is not high, the base station may select any one of the multiple beams that the mobile station is capable of monitoring to transmit the information to the UE. Alternatively, as shown in FIG. 6, in multiple consecutive time slots, the base station may transmit the same information to the mobile station respectively with one same beam of the beams that the mobile station is capable of monitoring, for example, considering that the UE is capable of monitoring 4 beams in total, therefore, the base station may transmit a same PDCCH1 to the UE by using a same beam in 4 consecutive time slots. Accordingly, in the embodiment shown in FIG. 6, the UE will sequentially monitor the information transmitted by the base station in each time slot of these 4 consecutive slots respectively using each of the four beams that it is capable of monitoring, to ensure that the UE is certainly capable of receiving and decoding the information transmitted by the base station after at least 4 time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH2 by using a same beam in 6 consecutive time slots, so that the UE is capable of acquiring the information transmitted by the base station through a sequential monitoring of each beam in the 6 consecutive time slots.

FIG. 7 shows a schematic diagram of a beam transmission scheme between the base station and the UE in one embodiment of the present invention. As shown in FIG. 7, the mobile station may also simultaneously monitor, for example, 4 beams, but is capable of monitoring only one beam in one time slot. When the requirement of the UE for channel robustness is high, the base station may transmit the information to the mobile station respectively with different beams in the beams that the mobile station is capable of monitoring in multiple consecutive time slots. Alternatively, as shown in FIG. 7, in multiple consecutive time slots, the base station may sequentially transmit the same information to the mobile station with one beam of the beams that the mobile station is capable of monitoring. For example, considering that the UE is capable of monitoring 4 beams in total, therefore, the base station may transmit the same PDCCH1 to the UE in 4 consecutive time slots by sequentially adopting the 4 beams that the UE is capable of monitoring. Accordingly, in the embodiment shown in FIG. 7, the UE will monitor the information transmitted by the base station in each time slot of the 4 consecutive time slots respectively using the beam used by the base station to transmit the information in the current time slot, to ensure that the UE may receive and decode the information transmitted by the base station with the beam used by the base station to transmit the information each time in these 4 time slots. Of course, in this embodiment, if the requirement of the UE for channel robustness is not very high, the base station may further transmit different information to the UE in different time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH1 with different beams in 6 consecutive time slots; or may transmit the PDCCH1 in the first 3 time slots and the PDCCH2 in the last 3 time slots. The UE will respectively receive the information transmitted by the base station in these 6 consecutive time slots through a corresponding beam.

In the embodiments of the present invention, since the UE needs to use the beam currently used by the base station for transmitting the information to monitor the information transmitted by the base station in each time slot, the UE and the base station need to coordinate in, for example, beam information that the base station will use to transmit the information in the next time slot. Alternatively, when the base station transmits the reference signals (RSs) for beam selection to the mobile station, the number of beams that need to be selected and reported, such as 3 beams, may be notified to the UE at the same time. After receiving the RSs, the UE will carry out measurement, and report information of the selected 3 beams to the base station according to an indication of the base station. Accordingly, after receiving the 3 beams reported by the UE, the base station will sequentially transmit the PDCCH according to an order of the beams reported by the UE, so that the UE is capable of correctly selecting corresponding beams to monitor the information transmitted by the base station. Furthermore, in another embodiment of the present invention, the base station may not need to inform the UE of the number of beams to be reported when transmitting the RSs. In this case, the UE will report all the beam information that it is capable of monitoring to the base station, and when determining to use, for example, the beam transmission scheme shown in FIG. 7 to transmit the information, the base station will inform the UE of the number of beams that it chooses to use, and sequentially transmit the information according to the order reported by the UE. For example, the base station will inform the UE that it will use 3 beams of 5 beams reported by the UE to transmit the PDCCH, and the UE will monitor according to the order correspondence of the beams reported by itself in 3 consecutive time slots. Preferably, the UE may further repeat this monitoring order in the next three time slots, instead of using the other two beams of the 5 beams that it reports, to monitor information. In another embodiment of the present invention, the base station may further select any beam to transmit according to information of the beam selection reported by the UE, and directly inform the UE of the indication information of the beam that it will use to transmit the information, so that the UE selects the corresponding beam to monitor in time. The above coordination scheme for the beam information between the base station and the UE is only an example, and the implementation in the embodiments of the present invention is not limited thereto.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams, to obtain the complete PDCCH information according to specific association conditions. This may greatly reduce level of coding rate transmitted on beams. For example, when the base station divides one PDCCH into N parts and transmits the N parts on N beams, the coding rate transmitted on the beams may be reduced to 1/N of an original one.

The beam configuration method in the embodiments of the present invention, which respectively consider different performance of the UE and requirements for channel robustness, has been described with the above various embodiments in FIG. 4-FIG. 7. In practical application scenarios, the requirement of the UE for channel robustness may not be constant under different performance of the UE. Therefore, it may also be considered to propose more beam transmission schemes in combination with the respective exemplary embodiments in FIG. 4-FIG. 7. FIG. 8 shows a schematic diagram of a beam transmission scheme in the embodiment of the present invention. According to that shown in FIG. 8, in one time slot, the UE is capable of simultaneously monitoring multiple beams and will perform blind detection for all beams that it is capable of monitoring in each time slot. The numbers of beams that the base station may use to transmit the information in different time slots in FIG. 8 are not the same. For example, in one time slot, the base station transmits the information with one of the multiple beams that the UE is capable of monitoring, while in another time slot, the base station will transmit the information with multiple beams. The information transmitted by the base station in different time slots or on different beams may also be the same or different. In short, the embodiment in FIG. 8 may be equivalent to a variant of the beam transmission scheme in which the embodiments shown in FIG. 4 and FIG. 5 are combined respectively. It should be noted that the combined beam transmission scheme in FIG. 8 is only an example, and the number of time slots for the case where the base station transmits with one beam, the number of time slots for the case where the base station transmits with multiple beams and the transmitted information may all be flexibly adjusted according to practical application scenarios, and are not limited herein.

FIG. 9 shows a schematic diagram of a beam transmission scheme in the embodiments of the present invention. According to that shown in FIG. 9, the UE is capable of simultaneously monitoring multiple beams, but in one time slot, the UE is capable of monitoring only one beam. The base station in FIG. 9 may choose to transmit the same information through the same beam in multiple consecutive time slots, so that the UE carries out blind detection, reception and decoding, or may also transmit the same or different information in different time slots with different beams, so that the UE respectively monitors the information transmitted by the base station by using the beam used by the base station to transmit the information in the current time slot. In short, the embodiment in FIG. 9 may be equivalent to a variant of the beam transmission scheme in which the embodiments shown in FIG. 6 and FIG. 7 are combined respectively. It should be noted that the combined beam transmission scheme in FIG. 9 is only an example, and a switching period between different beam transmission schemes and a content of the information transmitted may be flexibly adjusted according to practical application scenarios, and are not limited herein.

In the above embodiments of the present invention, predefined signaling may be adopted to indicate the respective behaviors of the base station and the UE in the beam transmission scheme. The signaling may be indicated in some special fields in physical broadcast channel (PBCH), DCI in CSS, MAC layer signaling, or physical downlink shared channel (PDSCH). For example, different beam transmission schemes may be indicated with a preset number of bits, such as indicated with 3 bits, where 000 indicates the beam transmission scheme in the example in FIG. 4, and 001 indicates the beam transmission scheme in the example in FIG. 5, and so on. In addition, a combination of different beam transmission schemes may be indicated by some preset fields, and the switching period between schemes or the like may be further illustrated.

When the UE monitors information on multiple beams, the base station may inform a manner of monitoring of the UE with signaling. For example, bit 1 may be used to indicate independent decoding for different monitored information, while bit 0 may be used to indicate to jointly decode multiple monitored information. Further, the base station may also indicate the spacing relationship on the time-frequency resources between the respective PDCCHs in the case of joint decoding with signaling.

In the embodiment as shown, for example, in FIG. 7, Alternatively, the base station may indicate the number of beams that the UE needs to select and report with indication information in some special fields in the physical broadcast channel (PBCH), the DCI in CSS, the MAC layer signaling, or the physical downlink shared channel (PDSCH), and specific information of the beam used in a certain time slot, such as beam ID, CRI feedback, or the like, may be exchanged between the base station and the UE.

The beam configuration method according to the embodiments of the present invention may enable the base station to determine the beam transmission scheme for the mobile station according to the performance of the mobile station, and to transmit the information with the beam transmission scheme. Accordingly, the mobile station receives and decodes the information transmitted by the base station by monitoring the corresponding beams, thereby improving stability and transmission quality of information transmission in a communication network.

A base station according to embodiments of the present invention will be described below with reference to FIG. 11. The base station may perform a beam configuration method described above. Since operations of the base station is substantially the same as steps of the beam configuration method described above, only a brief description thereof will be made herein, and a repeated description of the same content will be omitted.

Figure 11:
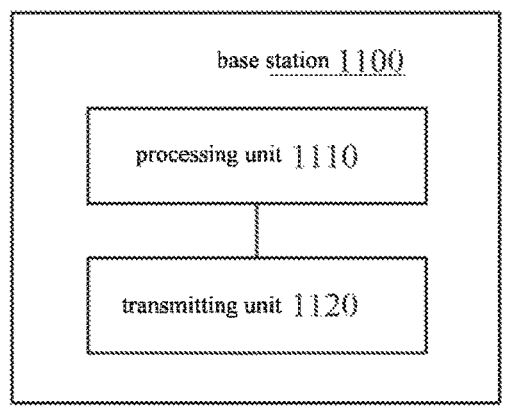
FIG. 11 shows a block diagram of a base station according to embodiments of the present invention.

As shown in FIG. 11, the base station 1100 includes a processing unit 1110 and a transmitting unit 1120. It needs to be noted that FIG. 11 shows only components related to the embodiments of the present disclosure, while other components are omitted. However, this is merely illustrative, and base station 1100 may include other components as needed.

Processing unit 1110 determines a beam transmission scheme for the mobile station according to performance of the mobile station. The performance of the mobile station may be determined by the number of beams that the mobile station is capable of simultaneously monitoring in one time slot. Of course, the representation manner of the performance of the mobile station is only an example. In the embodiments of the present invention, the processing unit 1110 may also utilize other manners of determining the performance of the mobile station, and no limitation is imposed herein. The performance of the mobile station may be made known to the processing unit 1110 of the base station by means of the mobile station reporting to the base station. For example, the processing unit 1110 of the base station may transmit reference signals (RSs) for beam selection or the like to the mobile station. The mobile station carries out measurement after receiving the RSs transmitted by the base station, and reports to the base station the number of beams that the mobile station is capable of monitoring simultaneously in one time slot and indication information for each selected beam, such as beam-index or the like. Of course, the above manner of determining the performance of the mobile station is only an example. In practical applications, any other manner of determining the performance of the mobile station may be adopted, and no limitation is imposed herein.

In another embodiment of the present invention, the processing unit 1110 may not only determine the beam transmission scheme according to the performance of the mobile station, but also jointly determine an appropriate beam transmission scheme and transmit the information by further combining a requirement of the mobile station for the PDCCH channel robustness. For example, when the speed of the UE is high, in a scenario requiring high robustness and low latency, for example a URLLC scenario, the base station may repeatedly transmit the same PDCCH on multiple beams. When the speed of the UE is low and the requirement for channel robustness is not high, the base station may choose to transmit the PDCCH on a single beam, and the PDCCHs transmitted on different beams are different.

The transmitting unit 1120 transmits the information to the mobile station according to the beam transmission scheme.

Different beam transmission schemes as well as manners in which the transmitting unit 1120 transmits the information to the mobile station will be described in detail below according to different UE performance and/or the requirement of the mobile station for the channel robustness. In one embodiment of the present invention, when the UE is capable of monitoring multiple beams simultaneously in one time slot, the base station may transmit the information to the mobile station by using one or more of the multiple beams that the mobile station is capable of monitoring. FIG. 4 shows a schematic diagram of the beam transmission scheme between the base station and the UE in one embodiment of the present invention. As shown in FIG. 4, in one time slot, the mobile station is capable of monitoring simultaneously, for example, 4 beams. In this case, when the requirement of the UE for channel robustness is not high, the base station may select one of the multiple beams that the mobile station is capable of monitoring to transmit the information to the UE. Alternatively, as shown in FIG. 4, in each time slot, the base station may respectively transmit different information, such as PDCCH1 and PDCCH2, on different beams. Of course, the base station may also choose to transmit the same information with the same or different beams in different time slots, for example, transmitting PDCCH1 in multiple time slots to further improve the robustness of the PDCCH. Accordingly, in the embodiment shown in FIG. 4, the UE will respectively monitor the information transmitted by the base station by using the multiple beams that it is capable of monitoring in each time slot to ensure that the information transmitted by the base station can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

FIG. 5 shows a schematic diagram of the beam transmission scheme between the base station and the UE in another embodiment of the present invention. As shown in FIG. 5, in one time slot, the mobile station is also capable of monitoring 4 beams simultaneously, and in the case that the requirement of the UE for channel robustness is high, the base station may select at least two beams from the multiple beams that the mobile station is capable of monitoring to transmit the information to the UE. In the example shown in FIG. 5, in one time slot, the base station selects each of the 4 beams that the mobile station is capable of monitoring to transmit the information to the mobile station. Alternatively, for the requirement for the PDCCH robustness, as shown in FIG. 5, in each time slot, the base station may respectively transmit the same information on different beams. For example, in one time slot, the information transmitted by the base station through all the beams is PDCCH1, and in a next time slot, the information transmitted by the base station through all beams is PDCCH2. Of course, if the requirement of the UE for channel robustness is not that high, the base station may also adopt a manner of beam division multiplexing (BDM) to transmit different information on different beams in one time slot. For example, in one same time slot, the base station may transmit PDCCH1 on any three beams of the whole four beams and transmit PDCCH2 on the other one of the whole four beams. The description of the number of beams used by the base station and transmitting information is only an example, and in practical applications, no limitation is imposed on this. Accordingly, in the embodiment shown in FIG. 5, the UE will respectively monitor the information transmitted by the base station by using multiple beams that it is capable of monitoring in each time slot to ensure that the information transmitted by the base station on all beams can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

In the embodiments of the present invention, the UE may independently decode the information on each monitored beam, and may also jointly decode the information on all beams. When joint decoding is perfomed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions, to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

In another embodiment of the present invention, when the mobile station is capable of monitoring multiple beams, but in one time slot the UE is capable of monitoring only one beam, the base station may transmits the information to the mobile station in one time slot by using one of the multiple beams that the mobile station is capable of monitoring. FIG. 6 shows a schematic diagram of a beam transmission scheme between the base station and the UE in one embodiment of the present invention. As shown in FIG. 6, the mobile station is capable of simultaneously monitoring, for example, 4 beams, but in one time slot, the mobile station is capable of monitoring only one beam of the 4 beams. In this case, when the requirement of the UE for channel robustness is not high, the base station may select any one of the multiple beams that the mobile station is capable of monitoring to transmit the information to the UE. Alternatively, as shown in FIG. 6, in multiple consecutive time slots, the base station may transmit the same information to the mobile station with one same beam of the beams that the mobile station is capable of monitoring. For example, considering that the UE is capable of monitoring 4 beams in total, therefore, the base station may transmit a same PDCCH1 to the UE by using a same beam in 4 consecutive time slots. Accordingly, in the embodiment shown in FIG. 6, the UE will sequentially monitor the information transmitted by the base station in each time slot of these 4 consecutive slots by respectively using each of the four beams that it is capable of monitoring, to ensure that the UE is certainly capable of receiving and decoding the information transmitted by the base station after at least 4 time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH2 by using a same beam in 6 consecutive time slots, so that the UE is capable of acquiring the information transmitted by the base station through a sequential monitoring of each beam in the 6 consecutive time slots.

FIG. 7 shows a schematic diagram of a beam transmission scheme between the base station and the UE in one embodiment of the present invention. As shown in FIG. 7, the mobile station may also simultaneously monitor, for example, 4 beams, but is capable of monitoring only one beam in one time slot. When the requirement of the UE for channel robustness is high, the base station may transmit the information to the mobile station respectively with different beams in the beams that the mobile station is capable of monitoring in multiple consecutive time slots. Alternatively, as shown in FIG. 7, in multiple consecutive time slots, the base station may sequentially transmit the same information to the mobile station with one beam of the beams that the mobile station is capable of monitoring. For example, considering that the UE is capable of monitoring 4 beams in total, therefore, the base station may transmit the same PDCCH1 to the UE in 4 consecutive time slots by sequentially adopting the 4 beams that the UE is capable of monitoring. Accordingly, in the embodiment shown in FIG. 7, the UE will monitor the information transmitted by the base station in each time slot of the 4 consecutive time slots by respectively using the beam used by the base station to transmit the information in the current time slot, to ensure that the UE may receive and decode the information transmitted by the base station with the beam used by the base station to transmit the information each time in these 4 time slots. Of course, in this embodiments, if the requirement of the UE for channel robustness is not very high, the base station may further transmit different information to the UE in different time slots. In the embodiment of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH1 with different beams in 6 consecutive time slots; or may transmit the PDCCH1 in the first 3 time slots and the PDCCH2 in the last 3 time slots. The UE will respectively receive the information transmitted by the base station in these 6 consecutive time slots through a corresponding beam.

In the embodiments of the present invention, since the UE needs to use the beam currently used by the base station for transmitting the information to monitor the information transmitted by the base station in each time slot, the UE and the base station need to coordinate in, for example, beam information that the base station will use to transmit the information in the next time slot. Alternatively, when the base station transmits the reference signals (RSs) for beam selection to the mobile station, the number of beams that need to be selected and reported, such as 3 beams, may be notified to the UE at the same time. After receiving the RSs, the UE will carry out measurement, and report information of the selected 3 beams to the base station according to an indication of the base station. Accordingly, after receiving the 3 beams reported by the UE, the base station will sequentially transmit the PDCCH according to an order of the beams reported by the UE, so that the UE is capable of correctly selecting corresponding beams to monitor the information transmitted by the base station. Furthermore, in another embodiment of the present invention, the base station may not need to inform the UE of the number of beams to be reported when transmitting the RSs. In this case, the UE will report all the beam information that it is capable of monitoring to the base station, and when determining to use, for example, the beam transmission scheme shown in FIG. 7 to transmit the information, the base station will inform the UE of the number of beams that it chooses to use, and sequentially transmit the information according to the order reported by the UE. For example, the base station will inform the UE that it will use 3 beams of 5 beams reported by the UE to transmit the PDCCH, and the UE will monitor according to the order correspondence of the beams reported by itself in 3 consecutive time slots. Preferably, the UE may further repeat this monitoring order in the next three time slots, instead of using the other two beams of the 5 beams that it reports, to monitor information. In another embodiment of the present invention, the base station may further select any beam to transmit according to information of the beam selection reported by the UE, and directly inform the UE of the indication information of the beam that it will use to transmit the information, so that the UE selects the corresponding beam to monitor in time. The above coordination scheme for the beam information between the base station and the UE is only an example, and the implementation in the embodiments of the present invention is not limited thereto.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions, to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

A beam configuration method in the embodiments of the present invention, which respectively consider different performance of the UE and requirements for channel robustness, has been described with the above various embodiments in FIG. 4-FIG. 7. In practical application scenarios, the requirement of the UE for channel robustness may not be constant under different performance of the UE. Therefore, it may also be considered to propose more beam transmission schemes in combination with the respective exemplary embodiments in FIG. 4-FIG. 7. FIG. 8 shows a schematic diagram of a beam transmission scheme in the embodiment of the present invention. According to that shown in FIG. 8, in one time slot, the UE is capable of simultaneously monitoring multiple beams and will perform blind detection for all beams that it is capable of monitoring in each time slot. The numbers of beams that the base station may use to transmit the information in different time slots in FIG. 8 are not the same. For example, in one time slot, the base station transmits the information with one of the multiple beams that the UE is capable of monitoring, while in another time slot, the base station will transmit the information with multiple beams. The information transmitted by the base station in different time slots or on different beams may also be the same or different. In short, the embodiment in FIG. 8 may be equivalent to a variant of the beam transmission scheme in which the embodiments shown in FIG. 4 and FIG. 5 are combined respectively. It should be noted that the combined beam transmission scheme in FIG. 8 is only an example, and the number of time slots for the case where the base station transmits with one beam, the number of time slots for the case where the base station transmits with multiple beams and the transmitted information may all be flexibly adjusted according to practical application scenarios, and are not limited herein.

FIG. 9 shows a schematic diagram of a beam transmission scheme in the embodiment of the present invention. According to that shown in FIG. 9, the UE is capable of simultaneously monitoring multiple beams, but in one time slot, the UE is capable of monitoring only one beam. The base station in FIG. 9 may choose to transmit the same information through the same beam in multiple consecutive time slots, so that the UE carries out blind detection, reception and decoding, or may also transmit the same or different information in different time slots with different beams, so that the UE respectively monitors the information transmitted by the base station by using the beam used by the base station to transmit the information in the current time slot. In short, the embodiment in FIG. 9 may be equivalent to a variant of the beam transmission scheme in which the embodiments shown in FIG. 6 and FIG. 7 are combined respectively. It should be noted that the combined beam transmission scheme in FIG. 9 is only an example, and a switching period between different beam transmission schemes and a content of the information transmitted may be flexibly adjusted according to practical application scenarios, and are not limited herein.

In the above embodiments of the present invention, predefined signaling may be adopted to indicate the respective behaviors of the base station and the UE in the beam transmission scheme. The signaling may be indicated in some special fields in physical broadcast channel (PBCH), DCI in CSS, MAC layer signaling, or physical downlink shared channel (PDSCH). For example, different beam transmission schemes may be indicated with a preset number of bits, such as indicated with 3 bits, where 000 indicates the beam transmission scheme in the example in FIG. 4, and 001 indicates the beam transmission scheme in the example in FIG. 5, and so on. In addition, a combination of different beam transmission schemes may be indicated by some preset fields, and the switching period between schemes or the like may be further illustrated.

When the UE monitors information on multiple beams, the base station may inform a manner of monitoring of the UE with signaling. For example, bit 1 may be used to indicate independent decoding for different monitored information, while bit 0 may be used to indicate to jointly decode multiple monitored information. Further, the base station may also indicate the spacing relationship on the time-frequency resources between the respective PDCCHs in the case of joint decoding with signaling.

In the embodiment as shown, for example, in FIG. 7, Alternatively, the base station may indicate the number of beams that the UE needs to select and report with indication information in some special fields in the physical broadcast channel (PBCH), the DCI in CSS, the MAC layer signaling, or the physical downlink shared channel (PDSCH), and specific information of the beam used in a certain time slot, such as beam ID, CRI feedback, or the like, may be exchanged between the base station and the UE.

The base station provided according to the embodiments of the present invention may determine the beam transmission scheme for the mobile station according to the performance of the mobile station, and transmit the information with the beam transmission scheme. Accordingly, the mobile station receives and decodes the information transmitted by the base station by monitoring the corresponding beams, thereby improving stability and transmission quality of information transmission in a communication network.

A UE according to embodiments of the present invention will be described below with reference to FIG. 12. The UE may perform a beam configuration method described above. Since operations of the UE is substantially the same as steps of the beam configuration method described above, only a brief description thereof will be made herein, and a repeated description of the same content will be omitted.

Figure 12:
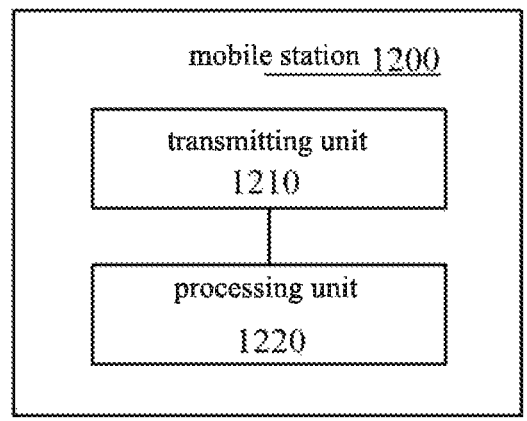
FIG. 12 shows a block diagram of a mobile station according to embodiments of the present invention.

As shown in FIG. 12, the UE 1200 includes a transmitting unit 1210 and a processing unit 1220. It needs to be noted that FIG. 12 only shows components related to the embodiment of the present disclosure, while other components are omitted, but this is merely illustrative, and the UE 1200 may include other components as needed.

The transmitting unit 1210 transmits performance of a mobile station. The performance of the mobile station may be determined by the number of beams that the mobile station is capable of simultaneously monitoring in one time slot. Of course, the representation manner of the performance of the mobile station is only an example. In the embodiments of the present invention, other manners of determining the performance of the mobile station may also be utilized, and no limitation is imposed herein. The performance of the mobile station may be made known to a base station by means of the transmitting unit 1210 of the mobile station reporting to the base station. For example, the mobile station may receive reference signals (RSs) for beam selection or the like transmitted by the base station and carry out measurement, and then report to the base station the number of beams that it is capable of simultaneously monitoring in one time slot and indication information of each selected beam, such as beam-index or the like. Of course, the above manner of determining the performance of the mobile station is only an example. In practical applications, any other manner of determining the performance of the mobile station may be adopted, and no limitation is imposed herein.

The processing unit 1220 monitors information transmitted by the base station according to a beam transmission scheme for the mobile station, the beam transmission scheme being determined by the base station according to the performance of the mobile station.

In one embodiment of the present invention, the base station determines the beam transmission scheme according to the performance of the mobile station, and carries out transmission, so that the mobile station monitors the information transmitted by the base station. In another embodiment of the present invention, the base station may not only determine the beam transmission scheme according to the performance of the mobile station, but also jointly determine an appropriate beam transmission scheme and transmit the information by further combining a requirement of the mobile station for the PDCCH channel robustness. For example, when the speed of the UE is high, in a scenario requiring high robustness and low latency, for example a URLLC scenario, the base station may repeatedly transmit the same PDCCH on multiple beams. When the speed of the UE is low and the requirement for channel robustness is not high, the base station may choose to transmit the PDCCH on a single beam, and the PDCCHs transmitted on different beams are different.

Different beam transmission schemes will be described in detail below according to different UE performance and the requirement of the UE for channel robustness. In one embodiment of the present invention, when the UE is capable of monitoring multiple beams simultaneously in one time slot, the base station may transmit the information to the mobile station by using one or more of the multiple beams that the mobile station is capable of monitoring. FIG. 4 shows a schematic diagram of the beam transmission scheme between the base station and the UE in one embodiment of the present invention. As shown in FIG. 4, in one time slot, the mobile station is capable of monitoring simultaneously, for example, 4 beams. In this case, when the requirement of the UE for channel robustness is not high, the base station may select one of the multiple beams that the mobile station is capable of monitoring to transmit the information to the UE. Alternatively, as shown in FIG. 4, in each time slot, the base station may respectively transmit different information, such as PDCCH1 and PDCCH2, on different beams. Of course, the base station may also choose to transmit the same information with the same or different beams in different time slots, for example, transmitting PDCCH1 in multiple time slots to further improve the robustness of the PDCCH. Accordingly, in the embodiment shown in FIG. 4, the UE will respectively monitor the information transmitted by the base station by using the multiple beams that it is capable of monitoring in each time slot to ensure that the information transmitted by the base station can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

FIG. 5 shows a schematic diagram of the beam transmission scheme between the base station and the UE in another embodiment of the present invention. As shown in FIG. 5, in one time slot, the mobile station is also capable of monitoring 4 beams simultaneously, and in the case that the requirement of the UE for channel robustness is high, the base station may select at least two beams from the multiple beams that the mobile station is capable of monitoring to transmit the information to the UE. In the example shown in FIG. 5, in one time slot, the base station selects each of the 4 beams that the mobile station is capable of monitoring to transmit the information to the mobile station. Alternatively, for the requirement for the PDCCH robustness, as shown in FIG. 5, in each time slot, the base station may respectively transmit the same information on different beams. For example, in one time slot, the information transmitted by the base station through all the beams is PDCCH1, and in a next time slot, the information transmitted by the base station through all beams is PDCCH2. Of course, if the requirement of the UE for channel robustness is not that high, the base station may also adopt a manner of beam division multiplexing (BDM) to transmit different information on different beams in one time slot. For example, in one same time slot, the base station may transmit PDCCH1 on any three beams of the whole four beams and transmit PDCCH2 on the other one of the whole four beams. The description of the number of beams used by the base station and transmitting information is only an example, and in practical applications, no limitation is imposed on this. Accordingly, in the embodiment shown in FIG. 5, the UE will respectively monitor the information transmitted by the base station by using multiple beams that it is capable of monitoring in each time slot to ensure that the information transmitted by the base station on all beams can be received and decoded. That is, the UE may perform blind detection for the information on all beams in each time slot. In the embodiments of the present invention, the performance of the UE, that is, being capable of monitoring 4 beams simultaneously, is only an example. In practical applications, the number of beams that the UE is capable of monitoring simultaneously in one time slot is not limited.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams according to specific association conditions to obtain the complete PDCCH information. This may greatly reduce level of coding rate transmitted on beams. For example, when the base station divides one PDCCH into N parts and transmits the N parts on N beams, the coding rate transmitted on the beams may be reduced to 1/N of an original one.

In another embodiment of the present invention, when the mobile station is capable of monitoring multiple beams, but in one time slot the UE is capable of monitoring only one beam, the base station may transmits the information to the mobile station in one time slot by using one of the multiple beams that the mobile station is capable of monitoring. FIG. 6 shows a schematic diagram of a beam transmission scheme between the base station and the UE in one embodiment of the present invention. As shown in FIG. 6, the mobile station is capable of simultaneously monitoring, for example, 4 beams, but in one time slot, the mobile station is capable of monitoring only one beam of the 4 beams. In this case, when the requirement of the UE for channel robustness is not high, the base station may select any one of the multiple beams that the mobile station is capable of monitoring to transmit the information to the UE. Alternatively, as shown in FIG. 6, in multiple consecutive time slots, the base station may transmit the same information to the mobile station respectively with one same beam of the beams that the mobile station is capable of monitoring, for example, considering that the UE is capable of monitoring 4 beams in total, therefore, the base station may transmit a same PDCCH1 to the UE by using a same beam in 4 consecutive time slots. Accordingly, in the embodiment shown in FIG. 6, the UE will sequentially monitor the information transmitted by the base station in each time slot of these 4 consecutive slots respectively using each of the four beams that it is capable of monitoring, to ensure that the UE is certainly capable of receiving and decoding the information transmitted by the base station after at least 4 time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH2 by using a same beam in 6 consecutive time slots, so that the UE is capable of acquiring the information transmitted by the base station through a sequential monitoring of each beam in the 6 consecutive time slots.

FIG. 7 shows a schematic diagram of a beam transmission scheme between the base station and the UE in one embodiment of the present invention. As shown in FIG. 7, the mobile station may also simultaneously monitor, for example, 4 beams, but is capable of monitoring only one beam in one time slot. When the requirement of the UE for channel robustness is high, the base station may transmit the information to the mobile station respectively with different beams in the beams that the mobile station is capable of monitoring in multiple consecutive time slots. Alternatively, as shown in FIG. 7, in multiple consecutive time slots, the base station may sequentially transmit the same information to the mobile station with one beam of the beams that the mobile station is capable of monitoring. For example, considering that the UE is capable of monitoring 4 beams in total, therefore, the base station may transmit the same PDCCH1 to the UE in 4 consecutive time slots by sequentially adopting the 4 beams that the UE is capable of monitoring. Accordingly, in the embodiment shown in FIG. 7, the UE will monitor the information transmitted by the base station in each time slot of the 4 consecutive time slots respectively using the beam used by the base station to transmit the information in the current time slot, to ensure that the UE may receive and decode the information transmitted by the base station with the beam used by the base station to transmit the information each time in these 4 time slots. Of course, in this embodiment, if the requirement of the UE for channel robustness is not very high, the base station may further transmit different information to the UE in different time slots. In the embodiments of the present invention, the performance of the UE, that is, being capable of monitoring 4 beams simultaneously, is only an example. In practical applications, the number of beams that the UE is capable of monitoring simultaneously in one time slot is not limited. For example, when the UE is capable of monitoring 6 beams, the base station may transmit the PDCCH1 with different beams in 6 consecutive time slots; or may transmit the PDCCH1 in the first 3 time slots and the PDCCH2 in the last 3 time slots. The UE will respectively receive the information transmitted by the base station in these 6 consecutive time slots through a corresponding beam.

In the embodiments of the present invention, since the UE needs to use the beam currently used by the base station for transmitting the information to monitor the information transmitted by the base station in each time slot, the UE and the base station need to coordinate in, for example, beam information that the base station will use to transmit the information in the next time slot. Alternatively, when the base station transmits the reference signal RS for beam selection to the mobile station, the number of beams that need to be selected and reported, such as 3 beams, may be notified to the UE at the same time. After receiving the RSs, the UE will carry out measurement, and report information of the selected 3 beams to the base station according to an indication of the base station. Accordingly, after receiving the 3 beams reported by the UE, the base station will sequentially transmit the PDCCH according to an order of the beams reported by the UE, so that the UE is capable of correctly selecting corresponding beams to monitor the information transmitted by the base station. Furthermore, in another embodiment of the present invention, the base station may not need to inform the UE of the number of beams to be reported when transmitting the RSs. In this case, the UE will report all the beam information that it is capable of monitoring to the base station, and when determining to use, for example, the beam transmission scheme shown in FIG. 7 to transmit the information, the base station will inform the UE of the number of beams that it chooses to use, and sequentially transmit the information according to the order reported by the UE. For example, the base station will inform the UE that it will use 3 beams of 5 beams reported by the UE to transmit the PDCCH, and the UE will monitor according to the order correspondence of the beams reported by itself in 3 consecutive time slots. Preferably, the UE may further repeat this monitoring order in the next three time slots, instead of using the other two beams of the 5 beams that it reports, to monitor information. In another embodiment of the present invention, the base station may further select any beam to transmit according to information of the beam selection reported by the UE, and directly inform the UE of the indication information of the beam that it will use to transmit the information, so that the UE selects the corresponding beam to monitor in time. The above coordination scheme for the beam information between the base station and the UE is only an example, and the implementation in the embodiments of the present invention is not limited thereto.

In the embodiments of the present invention, the UE may independently decode the information on each monitored beam, and may also jointly decode the information on all beams. When joint decoding is performed, each PDCCH information may be acquired by a predefined spacing relationship on the time-frequency resources between the respective PDCCHs. Preferably, the base station may transmit PDCCHs with the same aggregation level (AL) on different beam link pairs. In one embodiment of the present invention, the base station may further divide one piece of complete PDCCH information into several parts and transmit the parts on different beams, respectively, so that the mobile station decodes information monitored on different beams, to obtain the complete PDCCH information according to specific association conditions. This may greatly reduce level of coding rate transmitted on beams. For example, when the base station divides one PDCCH into N parts and transmits the N parts on N beams, the coding rate transmitted on the beam may be reduced to 1/N of an original one.

The beam configuration method in the embodiments of the present invention, which respectively consider different performance of the UE and requirements for channel robustness, has been described with the above various embodiments in FIG. 4-FIG. 7. In practical application scenarios, the requirement of the UE for channel robustness may not be constant under different performance of the UE. Therefore, it may also be considered to propose more beam transmission schemes in combination with the respective exemplary embodiments in FIG. 4-FIG. 7. FIG. 8 shows a schematic diagram of a beam transmission scheme in the embodiment of the present invention. According to that shown in FIG. 8, in one time slot, the UE is capable of simultaneously monitoring multiple beams and will perform blind detection for all beams that it is capable of monitoring in each time slot. The numbers of beams that the base station may use to transmit the information in different time slots in FIG. 8 are not the same. For example, in one time slot, the base station transmits the information with one of the multiple beams that the UE is capable of monitoring, while in another time slot, the base station will transmit the information with multiple beams. The information transmitted by the base station in different time slots or on different beams may also be the same or different. In short, the embodiment in FIG. 8 may be equivalent to a variant of the beam transmission scheme in which the embodiments shown in FIG. 4 and FIG. 5 are combined respectively. It should be noted that the combined beam transmission scheme in FIG. 8 is only an example, and the number of time slots for the case where the base station transmits with one beam, the number of time slots for the case where the base station transmits with multiple beams and the transmitted information may all be flexibly adjusted according to practical application scenarios, and are not limited herein.

FIG. 9 shows a schematic diagram of a beam transmission scheme in the embodiments of the present invention. According to that shown in FIG. 9, the UE is capable of simultaneously monitoring multiple beams, but in one time slot, the UE is capable of monitoring only one beam. The base station in FIG. 9 may choose to transmit the same information through the same beam in multiple consecutive time slots, so that the UE carries out blind detection, reception and decoding, or may also transmit the same or different information in different time slots with different beams, so that the UE respectively monitors the information transmitted by the base station by using the beam used by the base station to transmit the information in the current time slot. In short, the embodiment in FIG. 9 may be equivalent to a variant of the beam transmission scheme in which the embodiments shown in FIG. 6 and FIG. 7 are combined respectively. It should be noted that the combined beam transmission scheme in FIG. 9 is only an example, and a switching period between different beam transmission schemes and a content of the information transmitted may be flexibly adjusted according to practical application scenarios, and are not limited herein.

In the above embodiments of the present invention, predefined signaling may be adopted to indicate the respective behaviors of the base station and the UE in the beam transmission scheme. The signaling may be indicated in some special fields in physical broadcast channel (PBCH), DCI in CSS, MAC layer signaling, or physical downlink shared channel (PDSCH). For example, different beam transmission schemes may be indicated with a preset number of bits, such as indicated with 3 bits, where 000 indicates the beam transmission scheme in the example in FIG. 4, and 001 indicates the beam transmission scheme in the example in FIG. 5, and so on. In addition, a combination of different beam transmission schemes may be indicated by some preset fields, and the switching period between schemes or the like may be further illustrated.

When the UE monitors information on multiple beams, the base station may inform a manner of monitoring of the UE with signaling. For example, bit 1 may be used to indicate independent decoding for different monitored information, while bit 0 may be used to indicate to jointly decode multiple monitored information. Further, the base station may also indicate the spacing relationship on the time-frequency resources between the respective PDCCHs in the case of joint decoding with signaling.

In the embodiment as shown, for example, in FIG. 7, Alternatively, the base station may indicate the number of beams that the UE needs to select and report with indication information in some special fields in the physical broadcast channel (PBCH), the DCI in CSS, the MAC layer signaling, or the physical downlink shared channel (PDSCH), and specific information of the beam used in a certain time slot, such as beam ID, CRI feedback, or the like, may be exchanged between the base station and the UE.

The mobile station according to the embodiments of the present invention may enable the base station to determine the beam transmission scheme for the mobile station according to the performance of the mobile station, and to transmit the information with the beam transmission scheme. Accordingly, the mobile station receives and decodes the information transmitted by the base station by monitoring the corresponding beams, thereby improving stability and transmission quality of information transmission in a communication network.

Moreover, block diagrams used for the illustration of the above embodiments represent functional blocks in functional units. These functional blocks (components) are realized by any combination of hardware and/or software. In addition, the means for implementing respective function blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 13:
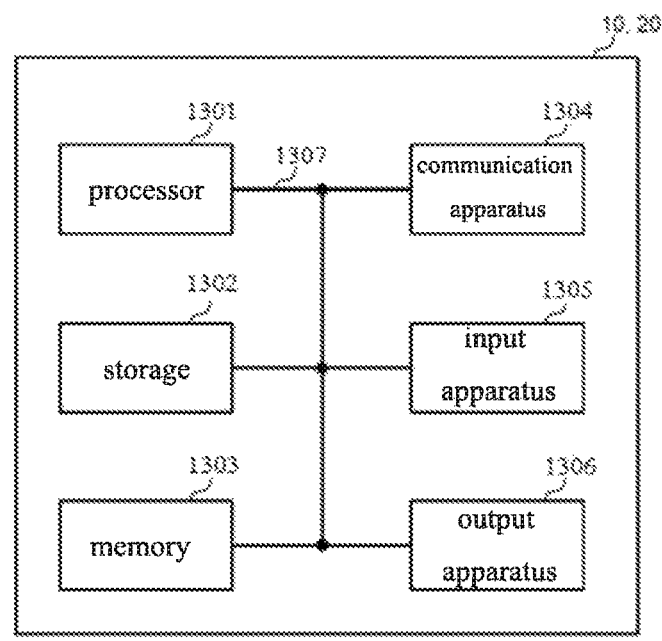
FIG. 13 shows an exemplary diagram of hardware configurations of communication devices to which one embodiment of the present invention relates.

For example, the radio base station, the user terminal and so on in one implementation of the present invention may function as a computer that executes the processes of the radio communication method of the present invention. FIG. 13 is a diagram that shows an example of a hardware structure of the radio base station 10 and user terminal 20 according to one implementation of the present invention. The above described radio base station 10 and user terminal 20 may be physically designed as a computer apparatus including a processor 1301, a storage 1302, a memory 1303, a communication apparatus 1304, an input apparatus 1305, an output apparatus 1306, and a bus 1107 and the like.

Moreover, in the following description, the word "apparatus" may be replaced by "circuit", "device", "unit" and so on. It should be noted that the hardware structure of the radio base station 10 and user terminal 20 may be designed to include one or more of each apparatus shown in the drawings, or may be designed not to include part of the apparatus.

For example, although only one processor 1301 is shown, a plurality of processors may be provided. Furthermore, processes may be implemented with one processor, or processes may be implemented either simultaneously or in sequence, or in different manners, on two or more processors. It should be noted that the processor 1301 may be implemented with one or more chips.

Each function of the radio base station 10 and user terminal 20 is implemented by reading predetermined software (program) on hardware such as the processor 1301 and the memory 1302, so as to make the processor 1301 perform calculations, and by controlling the communication carried out by the communication apparatus 1304, and the reading and/or writing of data in the memory 1302 and the storage 1303.

The processor 1301 may control the whole computer by, for example, running an operating system. The processor 1301 may be configured with a central processing unit (CPU), which includes interfaces with peripheral apparatus, control apparatus, computing apparatus, a register and so on.

Furthermore, the processor 1301 reads programs (program codes), software modules or data, from the storage 1303 and/or the communication apparatus 1304, into the memory 1302, and executes various processes according to these. As for the programs, programs to allow computers to execute at least part of the operations of the above-described embodiments may be used.

The memory 1302 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1302 may be referred to as a "register", a "cache", a "main memory" (primary storage apparatus) and so on. The memory 1302 can store executable programs (program codes), software modules and so on for implementing the radio communication methods according to embodiments of the present invention.

The storage 1303 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1303 may be referred to as "secondary storage apparatus."

The communication apparatus 1304 is hardware (transmitting/receiving device) for allowing inter-computer communication by using wired and/or wireless networks, and may be referred to as, for example, a "network device", a "network controller", a "network card", a "communication module" and so on. The communication apparatus 1304 may be configured to include a high frequency switch, a duplexer, a filter, a frequency synthesizer and so on in order to realize, for example, frequency division duplex (FDD) and/or time division duplex (TDD).

The input apparatus 1305 is an input device for receiving input from the outside (for example, a keyboard, a mouse, a microphone, a switch, a button, a sensor and so on). The output apparatus 1306 is an output device for allowing sending output to the outside (for example, a display, a speaker, an LED (Light Emitting Diode) lamp and so on). It should be noted that the input apparatus 1305 and the output apparatus 1306 may be provided in an integrated structure (for example, a touch panel).

Furthermore, these pieces of apparatus, including the processor 1301, the memory 1302 and so on are connected by the bus 1107 so as to communicate information. The bus 1107 may be formed with a single bus, or may be formed with buses that vary between pieces of apparatus.

Also, the radio base station 10 and user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1301 may be installed with at least one of these pieces of hardware.

Moreover, the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the radio frame may be composed of one or more periods (frames) in the time domain. Each of the one or more periods (frames) constituting the radio frame may also be referred to as a subframe. Further, a subframe may be composed of one or more slots in the time domain. The subframe may be a fixed length of time duration (eg, 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple microslots. Each microslot may be comprised of one or more symbols in the time domain. Furthermore, a microslot may also be referred as "a subframe".

A radio frame, a subframe, a slot, a microslot and a symbol all represent the time unit when transmitting signals. A radio frame, a subframe, a slot, a microslot and a symbol may also use other names that correspond to each other. For example, one subframe may be referred to as a "transmission time interval (TTI)", and a plurality of consecutive subframes may be referred to as a "TTI", and one slot or one microslot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a microslot, or the like instead of a subframe.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

Moreover, when one slot or one microslot is called a TTI, more than one TTI (i.e., more than one slot or more than one microslot) may also become the scheduled minimum time unit. Furthermore, the number of slots (the number of microslots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "microslot", or a "short microslot" and so on.

Moreover, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one microslot, one subframe or one TTI duration. One TTI and one subframe each may be comprised of one or more resource blocks, respectively. It should be noted that one or more RBs may also be referred to as a "physical resource block (PRB (Physical RB))", a "Sub-Carrier Group (SCG)", a "Resource Element Group (REG)", a "PRG pair", an "RB pair" and so on.

Also, a resource block may also be composed of one or more resource elements (RE). For example, one RE can be a radio resource area of a subcarrier and a symbol.

Moreover, the above-described structures of radio frames, subframes, slots, microslots and symbols and so on are simply examples. For example, configurations such as the number of subframes included in a radio frame, the number of slots of each subframe or radio frame, the number or microslots included in a slot, the number of symbols and RBs included in a slot or microslot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel), Physical Uplink Shared Channel (PUSCH), Physical Downlink Shared Channel (PDSCH) and so on) and information elements can be identified by any suitable names, the various names assigned to these various channels and information elements are not limited in any respect. In practical applications, for different channels, steps or operations may be applied to all or part of the methods in the embodiments of the present invention.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/implementations described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Moreover, physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of "X holds") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably. A base station may be referred to as a "fixed station", "NodeB", "eNodeB (eNB)", "access point", "transmission point", "receiving point", "femto cell", "small cell" and so on.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3th generation mobile communication system (SUPER 3G), IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include", "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A beam configuration method performed by a mobile station, comprising:
    transmitting performance of the mobile station;
    monitoring physical downlink control channels transmitted by a base station according to a beam transmission scheme for the mobile station, the beam transmission scheme being determined by the base station according to the performance of the mobile station,
    wherein the beam transmission scheme is used for transmitting the physical downlink control channels and the beam transmission scheme includes the base station respectively transmitting to the mobile station a same physical downlink control channel on different beams in one time slot.

2. The method of claim 1, wherein the monitoring physical downlink control channels transmitted by a base station according to a beam transmission scheme for the mobile station comprises:
    when the mobile station is capable of simultaneously monitoring multiple beams, monitoring the physical downlink control channels transmitted by the base station respectively using multiple beams that the mobile station is capable of monitoring in one time slot.

3. The method of claim 1,
    wherein the beam transmission scheme further includes the base station transmitting to the mobile station a physical downlink control channel in one time slot by using one of beams that the mobile station is capable of monitoring, and
    wherein the monitoring physical downlink control channels transmitted by a base station according to a beam transmission scheme for the mobile station comprises:
    when the mobile station is capable of monitoring multiple beams and is capable of monitoring only one beam in one time slot, monitoring a physical downlink control channel transmitted by the base station using one of the multiple beams that the mobile station is capable of monitoring in one time slot.

4. The method according to claim 3, wherein the monitoring physical downlink control channels transmitted by a base station according to a beam transmission scheme for the mobile station further comprises:
    sequentially monitoring the physical downlink control channels transmitted by the base station by respectively using each of the multiple beams that the mobile station is capable of monitoring in each time slot of multiple consecutive time slots.

5. The method of claim 3, wherein the monitoring physical downlink control channels transmitted by a base station according to a beam transmission scheme for the mobile station further comprises:
    when the base station transmits the physical downlink control channels to the mobile station respectively with different beams in the beams that the mobile station is capable of monitoring in multiple consecutive time slots, monitoring the physical downlink control channels transmitted by the base station by respectively using the beam used by the base station to transmit the physical downlink control channels in a current time slot in each time slot of the multiple consecutive time slots.

6. The method of claim 1,
wherein the beam transmission scheme further includes the base station transmitting to the mobile station different physical downlink control channels on different beams, and
wherein the monitoring physical downlink control channels transmitted by a base station according to a beam transmission scheme for the mobile station comprises:
when multiple beams that the mobile station is capable of monitoring are used to monitor different physical downlink control channels transmitted by the base station respectively, the obtained multiple different physical downlink control channels are combined to obtain a complete physical downlink control channel.

7. A base station, comprising:
a processing unit configured to determine a beam transmission scheme for a mobile station according to performance of the mobile station, wherein the beam transmission scheme is used for transmitting physical downlink control channels and the beam transmission scheme includes the base station respectively transmitting to the mobile station a same physical downlink control channel on different beams in one time slot;
a transmitting unit configured to transmit the physical downlink control channels to the mobile station according to the beam transmission scheme.

8. The base station of claim 7, wherein the processing unit is configured to determine the beam transmission scheme according to requirements of the mobile station for channel robustness.

9. The base station of claim 7, wherein the transmitting unit is configured to transmit the physical downlink control channels to the mobile station by using the beams that the mobile station is capable of monitoring, when the mobile station is capable of simultaneously monitoring multiple beams.

10. The base station of claim 9, wherein
when the physical downlink control channels are transmitted to the mobile station by using a plurality of beams in the beams that the mobile station is capable of monitoring, the physical downlink control channels transmitted on respective beams are different from each other.

11. The base station of claim 10, wherein
multiple physical downlink control channels, which are different from each other and transmitted on the plurality of beams, are parts of one complete physical downlink control channel respectively.

12. The base station of claim 7,
wherein the beam transmission scheme further includes the base station transmitting to the mobile station a physical downlink control channel in one time slot by using one of beams that the mobile station is capable of monitoring, and
wherein the transmitting unit is configured to transmit a physical downlink control channel to the mobile station in one time slot by using one of the beams that the mobile station is capable of monitoring, when the mobile station is capable of monitoring multiple beams and is capable of monitoring only one beam in one time slot.

13. The base station of claim 12, wherein the transmitting unit is configured to transmit the same physical downlink control channel to the mobile station respectively with a same beam of the beams that the mobile station is capable of monitoring in multiple consecutive time slots.

14. The base station of claim 12, wherein the transmitting unit is configured to transmit the physical downlink control channels to the mobile station respectively with different beams of the beams that the mobile station is capable of monitoring in multiple consecutive time slots.

15. A mobile station, comprising:
a transmitting unit configured to transmit performance of the mobile station;
a processing unit configured to monitor physical downlink control channels transmitted by the base station according to a beam transmission scheme for the mobile station, the beam transmission scheme being determined by the base station according to the performance of the mobile station, wherein the beam transmission scheme is used for transmitting the physical downlink control channels and the beam transmission scheme includes the base station respectively transmitting to the mobile station a same physical downlink control channel on different beams in one time slot.

16. The mobile station of claim 15, wherein the processing unit is configured to monitor the physical downlink control channels transmitted by the base station respectively using multiple beams that the mobile station is capable of monitoring in one time slot, when the mobile station is capable of simultaneously monitoring multiple beams.

17. The mobile station of claim 15,
wherein the beam transmission scheme further includes the base station transmitting to the mobile station a physical downlink control channel in one time slot by using one of beams that the mobile station is capable of monitoring, and
wherein the processing unit is configured to monitor the physical downlink control channels transmitted by the base station using one of multiple beams that the mobile station is capable of monitoring in one time slot, when the mobile station is capable of monitoring the multiple beams and is capable of monitoring only one beam in one time slot.

18. The mobile station according to claim 17, wherein the processing unit is configured to sequentially monitor the physical downlink control channels transmitted by the base station by respectively using each of the multiple beams that the mobile station is capable of monitoring in each time slot of multiple consecutive time slots.

19. The mobile station of claim 17, wherein the processing unit is configured to monitor the physical downlink control channels transmitted by the base station by respectively using the beam used by the base station to transmit the physical downlink control channels in a current time slot in each time slot of the multiple consecutive time slots, when the base station transmits the physical downlink control channels to the mobile station respectively with different beams in the beams that the mobile station is capable of monitoring in multiple consecutive time slots.

20. The mobile station of claim 15,
wherein the beam transmission scheme further includes the base station transmitting to the mobile station different physical downlink control channels on different beams, and
wherein the processing unit is configured to combine the obtained multiple different physical downlink control channels to obtain a complete physical downlink control channel, when multiple beams that the mobile station is capable of monitoring are used to monitor different physical downlink control channels transmitted by the base station respectively.

\* \* \* \* \*